United States Patent [19]

Clancy et al.

[11] Patent Number: 4,660,142
[45] Date of Patent: Apr. 21, 1987

[54] DIGITAL DATA PROCESSING SYSTEM EMPLOYING AN OBJECT-BASED ADDRESSING SYSTEM WITH A SINGLE OBJECT TABLE

[75] Inventors: Gerald F. Clancy, Saratoga, Calif.; Craig J. Mundie, Cary; Stephen I. Schleimer, Chapel Hill, both of N.C.; Steven J. Wallach, Saratoga, Calif.; Richard G. Bratt, Wayland; Edward S. Gavrin, Lincoln, both of Mass.

[73] Assignee: Data General Corporation, Westboro, Mass.

[21] Appl. No.: 659,513

[22] Filed: Oct. 11, 1984

Related U.S. Application Data

[63] Continuation of Ser. No. 266,534, May 22, 1981, abandoned.

[51] Int. Cl.[4] ................................. G06F 9/30
[52] U.S. Cl. ..................................... 364/200
[58] Field of Search ... 364/200 MS File, 900 MS File

[56] References Cited

U.S. PATENT DOCUMENTS

| | | | |
|---|---|---|---|
| 3,618,045 | 11/1971 | Campbell | 364/200 |
| 3,902,163 | 8/1975 | Amdahl | 364/200 |
| 3,902,164 | 8/1975 | Kelley | 364/200 |
| 4,079,453 | 3/1978 | Dahl | 364/200 |
| 4,084,228 | 4/1978 | Dufond | 364/200 |
| 4,133,030 | 1/1979 | Huettner | 364/200 |
| 4,148,098 | 4/1979 | McCreight | 364/200 |
| 4,155,119 | 5/1979 | De Ward et al. | 364/200 |

OTHER PUBLICATIONS

Madnick & Donovan, Text Book "Operating System" pp. 124-139, McGraw-Hill, 1974.

Primary Examiner—David Y. Eng
Attorney, Agent, or Firm—Robert F. O'Connell

[57] ABSTRACT

A digital data processing system including a processor and memory and employing object addressing. The digital data processing system further includes a system for organizing the system's memory into objects and a system for operating the memory. The memory organization system associates each item of data stored in the memory with an object and each object with an object identifier. The memory operation system performs memory operations on items of data in response to memory operation specifiers received from the processor. The location of a data item upon which a memory operation is to be performed is specified by a logical address. Each logical address contains an object number which is temporarily associated with one object identifier and an offset specifying a location in the object identified by the object identifier currently associated with the object number. The memory operation system includes a single object table which specifies the current temporary associations between object numbers and universal addresses and an object identifier conversion system which establishes the temporary associations in the object table and obtains the object identifiers associated with the object numbers. Also disclosed are object tables in digital data processing systems of the present invention involving a single memory and multiple processors and pointers and pointer to logical address conversion means in digital data processing systems of the present invention.

13 Claims, 1 Drawing Figure

DIGITAL DATA PROCESSING SYSTEM EMPLOYING AN OBJECT-BASED ADDRESSING SYSTEM WITH A SINGLE OBJECT TABLE

This application is a continuation, of application Ser. No. 266,534, filed May 22, 1981, now abandoned.

CROSS REFERENCE TO RELATED APPLICATIONS

The present patent application is related to U.S. patent application Ser. No. 06/266,530 filed on even date with the present application and assigned to the assignee of the present application now abandoned.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights. Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to digital computer systems employing object-based addressing. The digital computer system in which the present invention is employed includes a memory and a processor. The memory stores and outputs items of data including instructions in response to memory operation specifiers provided by the processor in response to the instructions.

The memory includes a system for organizing the memory into objects and a system for operating the memory. The memory organization system associates each item of data with an object and each object with an object identifier. The memory operation system performs memory operations in response to the memory operation specifiers. The location of the data item upon which a memory operation is performed is specified by a logical address. Each logical address contains an object number which is temporarily associated with one object identifier and an offset specifying a location in the object identified by the object identifier currently associated with the object number. The memory operation system includes a single object table which specifies the current temporary associations between object numbers and universal addresses and an object identifier conversion system which establishes the temporary associations in the object table and obtains the object identifiers associated with the object numbers.

It is thus an object of the invention to provide an improved digital computer system.

It is a further object of the invention to provide an improved object-based addressing system for a digital computer system.

It is another object of the invention to provide an object-based addressing system with improved logical addresses.

It is a still further object of the invention to provide an object-based addressing system having logical addresses containing object numbers and a single object table temporarily associating the object numbers in the logical addresses with object identifiers.

Other objects, advantages and features of the present invention will be understood by those of ordinary skill in the art, after referring to the following detailed description of the preferred embodiments and drawings wherein:

Figure 1:
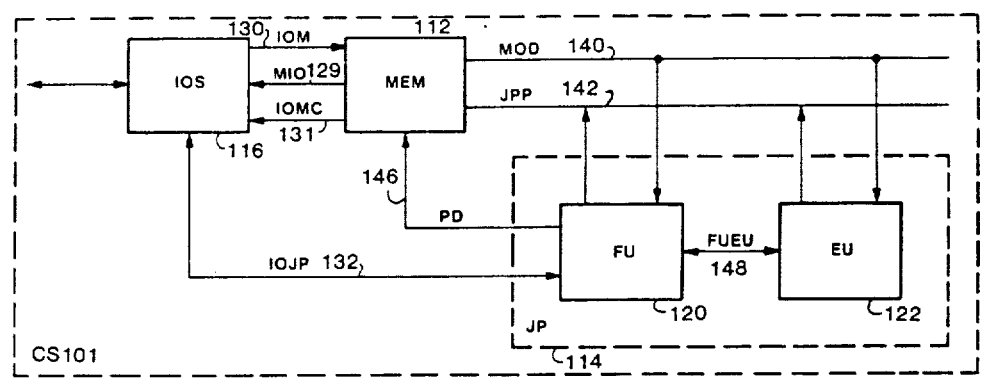
FIG. 1 is a partial block diagram of a computer system incorporating the present invention.

This application incorporates by reference the entire application, Ser. No. 266,402, filed on May 22, 1981, of Baxter et al., now issued as U.S. Pat. No. 4,455,602, on June 19, 1984.

We claim:

1. A digital data processing system comprising:
   (1) memory means for storing items of data at physical addresses therein and for performing memory operations on data items including the providing of data items in response to memory operation specifiers containing logical addresses; and
   (2) processor means connected to an having access to said memory means, said processor means including
      means for receiving data items from said memory means,
      means for processing said data items, and
      means for producing memory operation specifiers in response to instructions;

and wherein said memory means is organized into objects containing data items and includes
      memory organization means for specifying a correspondence between data items and objects and for permanently identifying said objects by unique object identifiers; and
   further wherein a logical address includes an object number temporarily corresponding to a specified unique object identifier and an offset specifying a location in the object identified by the unique object identifier currently corresponding to said object number; and
   further wherein said memory means includes
      memory operation means responsive to memory operation specifiers for performing the memory operations specified by said memory operation specifiers on the data items at the locations specified by said logical addresses, said memory operation means including
         object table means for specifying the temporary correspondence between said object numbers and said object identifiers; and
         object identifier conversion means responsive to said memory organization means for defining the temporary correspondence between said object numbers and said object identifiers in a single object table of said object table means and for using said single object table to obtain object numbers corresponding to object identifiers for use in forming logical addresses; and
         address conversion means responsive to said logical addresses for converting said logical addresses into physical addresses of data items in response thereto.

2. In the digital data processing system of claim 1, and further wherein:
   said digital data processing system further includes
   means for executing programs of instructions concurrently for a plurality of processes; and
   means for providing the instructions in the programs being concurrently executed to said processor means.

3. In the digital data processing system of claim 1, and further wherein:
   said memory organization means identifies each object with a single object identifier and said single object identifier never identifies any other object.

4. In the digital data processing system of claim 1, and further wherein:
   said data items include pointers for specifying locations in said objects, certain pointers including
      (a) an object identifier specifying an object; and
      (b) an offset specifying the location in the object specified by said object identifier; and
   said memory operation means includes
   pointer conversion means for receiving a pointer from said processor means, for using said object table to obtain the object number corresponding to the object identifier in said received pointer and for producing a logical address containing the corresponding object number and offset in said received pointer and providing said logical address to said processor means.

5. In the digital data processing system of claim 4, and further wherein:
   the offset in said logical address is defined in a bit-granular manner which specifies any bit of the data items associated with the object specified by the object identifier in said pointer.

6. A digital data processing system comprising:
(1) memory means for storing items of data at physical addresses therein and for performing memory operations on said data items including the providings of data items in response to memory operation specifiers containing logical addresses; and
(2) at leas one local processor means having access to said memory means for processing data items and for producing memory operation specifiers in response to instructions;
and wherein said memory means is organized into objects containing data items and includes
memory organization means for specifying a correspondence between data items and objects and for prmanently identifying said objects by unique object identifiers, and
further wherein a logical address includes an object number temporarily corresponding to an object identifier and an offset specifying a location in the object identified by the object identifier currently corresponding to said object number, and
further wherein said memory means includes
memory operation means responsive to memory operation specifiers for performing the memory operations specified by said memory operation specifiers on the data items at the locations specified by said logical addresses, said memory operation means including
at least one object table of data items for specifying the temporary correspondence between said object numbers and said object identifiers, each of said local processor means being associated with one object table and said associated object table defining the temporary correspondence between the object numbers used in said logical addresses by said associated local processor means and said object identifiers, and
an object identifier conversion means responsive to said memory organization means and operative with each object table for defining the temporary correspondence between object number and object identifiers in said object table and for using said object table to obtain the object numbers corresponding to the object identifiers for use in forming logical addresses used in said associated local processor means; and
address conversion means responsive to said logical addresses for converting said logical addresses into physical addresses of data items in response thereto.

7. In the digital data processing system of claim 6, and further wherein:
said local processor means includes means for executing programs of instructions concurrently for a plurality of processes: and
said digital data processing system further includes means associated with each local processor means for providing the instructions in the programs being concurrently executed by said local processor means to said local processor means.

8. In the digital data processing system of claim 6, and further wherein:
said memory organization means identifies each object with a single object identifier and said single object identifier never identifies any other object.

9. In a digital data processing system including at least one local digital data processing system, each system including at least local processor means for processing items of data in response to instructions, said digital data processing system including a universal addressing system for addressing data items comprising;
(1) universal memory means accessible to each of said local systems for storing data items at physical addresses therein and for performing memory operations on said data items including the providing of data items to said local systems, said universal memory means being organized into objects, uniquely and permanently identified by unique object identifiers, for containing data items, said universal memory means including
memory operation means responsive to memory operation specifiers containing logical addresses specifying locations in said universal memory means for performing the memory operations specified by said memory operation specifiers on data items at the locations specified by said logical addresses, each logical address including
(i) an object number temporarily corresponding to a unique object identifier; and
(ii) an offset specifying a location in the object identified by the unique object identifier currently specified by said object number, and said memory operation means including
(i) at least one object table of data items for specifying the temporary correspondence between said object numbers and said unique object identifiers, each local processor means being associated with one said object table and said associated object table defining the temporary correspondence between the object numbers used in said logical addresses by said associated local processor means and said unique object identifiers, and
(ii) unique object identifier conversion means responsive to said memory organization means and operative with each object table for defining the temporary correspondence between object numbers and unique object identifiers and for using said one object table to obtain the object numbers corresponding to the unique object identifiers for use in forming the logical addresses used in said local processor means;
(2) means in said local processor means for providing memory operation specifiers in response to instructions; and
(3) address conversion means responsive to said logical addresses for converting said logical addresses into physical addresses of data items in response thereto.

10. In the digital data processing system of claim 9, and further wherein:
said local processor means further includes
means for executing programs of instructions concurrently for a plurality of processes: and
said digital data processing system further includes means associated with each local processor means for providing the instructions in the programs being concurrently executed by said local processor means to said local processor means.

11. In the digital data processing system of claim 9, and further wherein:

said memory organization means identifies each object with a single unique identifier and said single unique identifier never identifies any other object.

12. In the digital data processing system of claim 9, and further wherein:

said data items include pointers for specifying locations in said objects, certain pointers including
  (a) a universal identifier specifying an object; and
  (b) an offset specifying the location in the object specified by said universal identifier; and said memory operation means includes pointer conversion means for receiving any said certain pointer from said processor means, for using said object table to obtain the object number corresponding to the universal identifier in said received certain pointer, and for producing the logical address which includes the corresponding object number and offset in said received certain pointer and for providing said logical address to said processor means.

13. In the digital data processing system of claim 12, and further wherein:

the offset in said logical address is defined in a bit-granular manner which specifies any bit of the data items associated with the object specified by the universal identifier in said certain pointer.

* * * * *